United States Patent [19]

Beha et al.

[11] Patent Number: 4,918,309
[45] Date of Patent: Apr. 17, 1990

[54] METHOD FOR INVESTIGATING SURFACES AT NANOMETER AND PICOSECOND RESOLUTION AND LASER-SAMPLED SCANNING TUNNELING MICROSCOPE FOR PERFORMING SAID METHOD

[75] Inventors: Johannes G. Beha, Wädenswil; Armin U. Blacha, Thalwil; Rolf Clauberg, Gattikon, all of Switzerland; Rolf B. Moeller, Munich, Fed. Rep. of Germany; Wolfgang D. Pohl, Adliswil, Switzerland

[73] Assignee: International Business Machines Corporation, Armonk, N.Y.

[21] Appl. No.: 209,403

[22] Filed: Jun. 20, 1988

[30] Foreign Application Priority Data

Jun. 22, 1987 [EP] European Pat. Off. ........ 87108907.4

[51] Int. Cl.⁴ ............................................. H01J 37/00
[52] U.S. Cl. ..................................... 250/306; 250/307
[58] Field of Search ..................... 250/306, 307, 423 F

[56] References Cited

U.S. PATENT DOCUMENTS 4,747,698  5/1988  Wickramasinghe et al. ....... 250/306
4,750,822  6/1988  Rosencwaig et al. .............. 356/445

Primary Examiner—Bruce C. Anderson
Attorney, Agent, or Firm—John J. Goodwin

[57] ABSTRACT

For observing material structures and/or dynamic processes at surfaces, the known scanning tunneling microscope (STM) is combined with a photoexcitation process leading to photon-assisted tunneling. Thereby, the very fine spatial resolution of the STM is combined with the picosecond or even femtosecond time resolution of laser pulses. The tunnel tip of a scanning tunneling microscope is positioned at tunnel distance with respect to the surface of the sample to be investigated, with an appropriate potential applied across the gap between the tunnel tip and the sample. The tunneling current is gated by means of at least one pulsed laser beam directed at the tuneling region and/or at the tunnel tip.

14 Claims, 2 Drawing Sheets

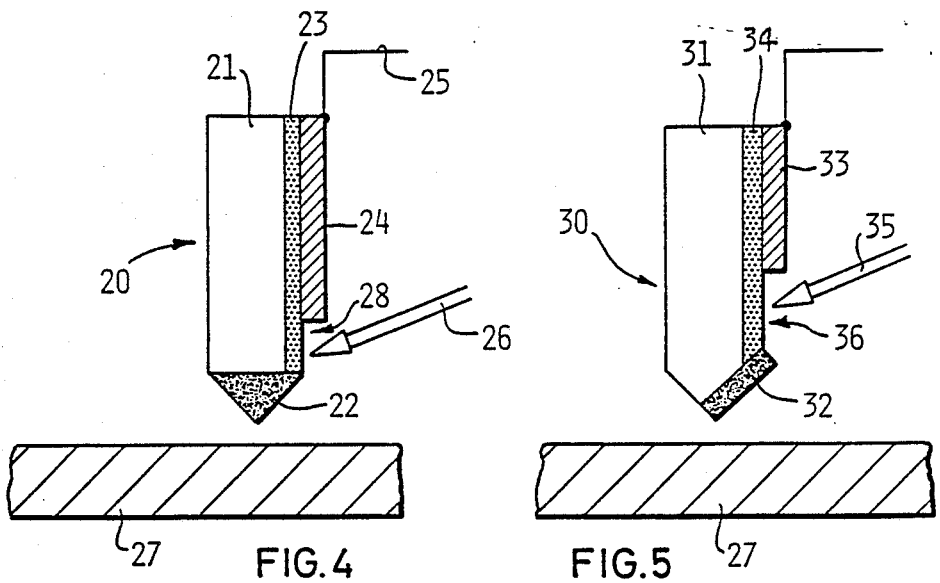
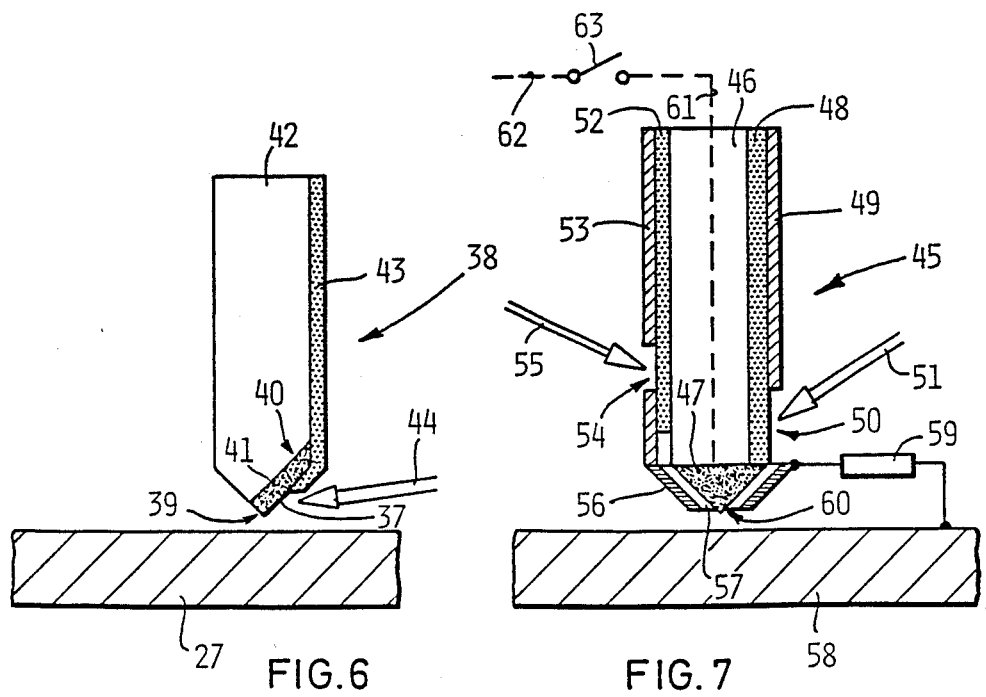

METHOD FOR INVESTIGATING SURFACES AT NANOMETER AND PICOSECOND RESOLUTION AND LASER-SAMPLED SCANNING TUNNELING MICROSCOPE FOR PERFORMING SAID METHOD

BACKGROUND OF THE INVENTION

1. Field of the Invention

The present invention relates to a method for investigating the surfaces of samples at nanometer and picosecond resolution and to a scanning tunneling microscope type device for performing this method. In particular, the invention relates to scanning tunneling microscopes in which the scanning operation is assisted by optical methods to make it faster than customary with state-of-the-art scanning tunneling microscopes. A typical application of the invention is testing integrated circuits for manufacturing quality and, hence, usability in computer or control environments.

2. Background Art

Since its invention in 1979, the Scanning Tunneling Microscope (STM) has evolved as a powerful tool for the investigation of surface structures down to the atomic level. The basic scanning tunneling microscope is described in U.S. Pat. No. 4,343,993. Briefly, a sharply pointed, electrically conductive tip is placed at a distance on the order of one nanometer from the (conductive) surface of the sample to be investigated, with an appropriate potential applied across the gap between the tip and surface. As the electron clouds of the atoms at the apex of the tip and at the surface touch, a flow of electrons will result giving rise to a tunneling current which happens to be extremely sensitive to changes in gap width. To render these changes as close as possible to zero, a feedback system controls the distance of the tip from the surface, using the deviations of the tunneling current from an initial value as a control signal. This control signal is also employed to generate a plot of the topography of the surface being investigated.

A steadily increasing demand for information relative to dynamic processes near and at surfaces and interfaces has developed in surface science, especially in the field of heterogeneous catalysis and in the development of ultra-fast devices. The only known possibility for achieving a time resolution in the picosecond or femtosecond range is given by optical methods based on pulsed laser excitation or by the inherent time-structure of synchroton radiation. These methods normally do not rely on spatial resolution.

The spatial resolution achievable with purely optical methods is based either on the focusing of an incident optical beam or on the image resolution of special electron optics. Examples of disclosures of the relevant techniques are European Patent Application EP-A 0 180 780, M. D. Jones, G. A. Massey, D. L. Habliston, and O. H. Griffith, Laser Excitation in Photoelectron Microscopy, Proc. 1st Int. Conf. on Electron Emission Microscopy, Tubingen, Sept. 1979, pp. 177–182, and G. A. Massey, M. D. Jones, and J. C. Johnson, Nonlinear Photoemission for Viewing Guided or Evanescent Waves, IEEE Journal of Quantum Electronics, Vol. QE-17, No. 6, June, 1981. With these techniques, the spatial resolution remains limited to about 0.1 $\mu$m which is insufficient, e.g., for the analysis of hot-electron transport in modern ultra-fast devices or multi-quantum-well structures. There, a spatial resolution of better than 10 nanometers is required.

Therefore, it is an object of the present invention to provide a technique and apparatus for the investigation of dynamic, ultra-fast surface phenomena with femto- to picosecond time resolution and with a spatial resolution down to the atomic level.

It is another object of the present invention to provide a technique and apparatus for combining high speed optical methods with STM - type devices to obtain enhanced time and spatial resolution in the analysis of rapidly occurring events.

SUMMARY OF THE INVENTION

Accordingly, the invention teaches a method and apparatus for investigating dynamic processes and/or the material structure at the surface of a sample, in which the tunnel tip of a scanning tunneling microscope type device is positioned relative to the surface of the sample to be investigated, a predetermined electrical potential is applied across the gap between the tunnel tip and the sample, and the tunneling current is gated by at least one optical pulse (such as from a laser beam) directed at the tunneling region and/or at the tunnel tip. Thus, a laser-sampled STM is provided that has the advantages of fast time resolution and atomic level spatial resolution.

These and other objects, features and advantages will be apparent from the following more particular description of the preferred embodiments.

BRIEF DESCRIPTION OF THE DRAWINGS

FIG. 4 shows a second embodiment of the invention in a first form;

FIG. 5 shows a second form of the embodiment of FIG. 4;

FIG. 6 is a modification of the structure of FIG. 5;

FIG. 7 is a third form of the embodiment of FIG. 4.

DESCRIPTION OF THE PREFERRED EMBODIMENTS

Figure 1:
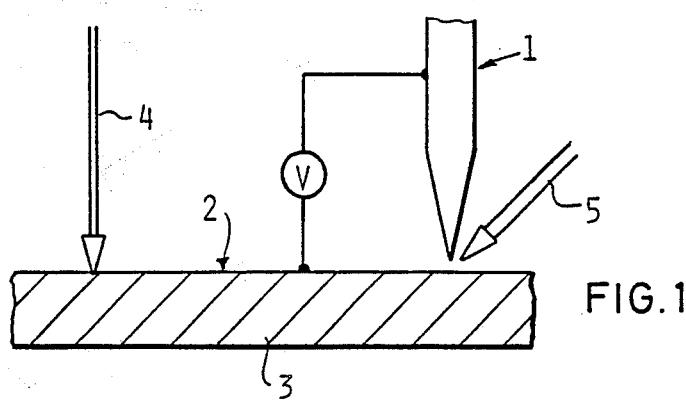
FIG. 1 schematically illustrates the principle of a first embodiment of the invention.

The principle of the first embodiment of the invention is shown in FIG. 1. The sharply pointed tip 1 of a conventional scanning tunneling microscope is positioned at a tunneling distance (i.e., on the order of 1 nm) over the surface 2 of a sample 3 to be investigated. In the way of stroboscopic scanning, a pulsed laser beam 4, for example but not of necessity, hereinafter called a "pump beam", is directed onto the surface 2 of sample 3 at a location distant from the position of tunneling tip 1. The impinging of the laser beam 4 onto the conductive surface 2 will cause an excitation of hot-electrons at the location of impact. Upon each excitation pulse, a bunch of hot-electrons will travel through sample 3.

The dynamic response of the system comprising the material of sample 3 and the electrons traveling therein is then probed by a stroboscopic sampling process with ultra-short laser pulses. At a certain distance from the location of impact of pump beam 4, preferably in the vicinity of the position of tunnel tip 1, another laser beam 5, synchronized with the pump beam 4, is directed onto surface 2 of sample 3. This additional beam 5 is also pulsed. Pulsed beam 5 will hereinafter be called the "probe pulse". The effect of probe pulse 5 hitting the surface of sample 3 is an excitation of the travelling hot-electrons to a higher energy level. This higher energy level is equal to the sum of the electrons' starting energy plus the photon energies of pump beam 4 and probe pulse 5 minus the energy losses the travelling electrons incur through inelastic scattering effects. If this resulting energy is still smaller than the work function, i.e., the energy required for an electron to overcome the binding energy of the metal and escape into vacuum, the electrons cannot leave sample 3 but will contribute to the tunneling current measured by tunnel tip 1, provided, of course, the tunneling voltage is chosen such that weakly bound, or excited, electrons can be detected.

By suitably adjusting the synchronization between the pumping process initiated by pump beam 4, and the probe pulse, viz. by appropriately delaying the probe pulse 5 versus pump beam 4 by a delay $\Delta t$ which the electrons need to travel from the location of impact of pump beam 4 to the location of impact of probe beam 5, the density of the hot-electrons as a function of time relative to their excitation time will be revealed in the tunneling current. The time resolution in this case is given by the width of the probe pulse 5 and by the jitter occurring between the excitation of the hot-electrons through pump beam 4 and the gating of probe pulse 5, i.e., during a time period $\Delta t$.

By properly positioning tunnel tip 1 and probe beam 5 relative to the excitation point, the entire kinetics of the excited electrons can be studied as a function of time and space. The spatial resolution is achieved by measuring this response via the tunneling current flowing through tip 1 of the scanning tunneling microscope. Both time and spatial resolution achieved with this technique are far beyond those attainable with any conventional methods.

In the following, several hardware realizations of the first embodiment of the invention will be discussed. It is known to those skilled in the STM art that in particular those electrons contribute to the measured signal in a scanning tunneling microscope which are closer to the tip of the STM than the mean free path of the electrons. Typically, the mean free path is on the order of 1 $\mu$m or even less, depending on the material under consideration. Consequently, it is preferable to focus the probe laser pulse at a location very close to the tip of the STM.

Figure 2:
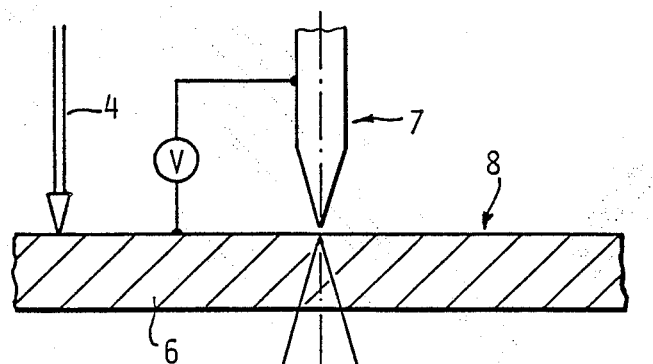
FIG. 2 shows another form of the first embodiment of the invention.

FIG. 2 schematically shows an arrangement for the investigation of a transparent sample 6. Tunnel tip 7 is positioned at tunneling distance above the surface 8 of sample 6. A probe laser beam 9 is directed onto the back of sample 6 and focused by a lens system 10 so as to have its focal point as close as possible to the surface 8 and in proper alignment with tip 7.

Figure 3:
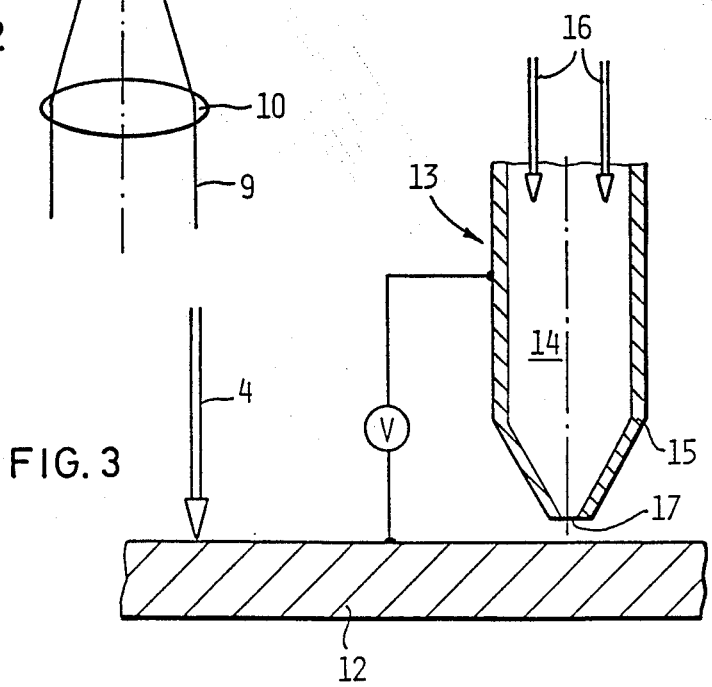
FIG. 3 shows a reverse arrangement of the structure of FIG. 2.

If the sample under investigation is not transparent to the laser light, preferably the tip of the STM should be transparent to the probe laser light since the dimensions of the tip are usually much larger than the mean free path of the electrons of the sample. FIG. 3 shows an arrangement with an opaque sample 12. The tip 13 of the STM consists of a transparent body 14, made of glass, for example, covered with a metal layer 15. Tip 13 thus can serve as a waveguide for the probe laser pulse 16 entering tip 13 from the rear.

At its apex 17, tip 13 has a very small aperture in its metal layer 15 allowing probe pulse 16 to exit in a focused fashion. Tunnel tips of the kind used in this embodiment have been disclosed in European Patent Application Nos. EP-A-0 112 401 and EP-A-0 112 401 and EP-A-0 112 402. These include tips having a crystal body, such as a quartz body, and a fused body, such as an optical glass fiber. With these tips, the area of sample 12 within which electrons may get excited by the probe pulse 16 is essentially restricted to the diameter of the aperture at the tip's apex. Under practical conditions, this diameter can be made as small as 10 nm. Reference is made to J. Appl. Phys. 59, 3318 (1986).

One example of an application of the present invention is the testing of integrated circuits for compliance with manufacturing specifications. One important aspect in this regard concerns the quality of the many thousands of connection lines a modern integrated circuit may have. The circuit designers usually take into account that a certain percentage of the connection lines will turn out to be of insufficient quality and, therefore, provide some redundancy when designing a circuit, i.e., some extra lines which are normally unused but which can activated to replace defective lines.

The testing of the integrated circuits with the aid of the invention is based, as mentioned above, on the effect that light impinging on a given material induces the emission of electrons, provided the energy of the light exceeds a certain material-dependent threshold so as to lift the energy level of the electrons above the work function. For the metallic materials used for the connection lines of integrated circuits, this threshold is exceeded if the impinging light is in the ultraviolet range. To determine the perfection of a connection line, a pump beam is focused on the line, and a tunnel tip is placed at a position distant from the point of impact of the laser beam. The energy of the pump beam is adjusted such that the excited electrons just do not reach their work function energy level. With a pulsed probe laser directed on the location of the tunnel tip, the energy levels of the electrons will locally surpass their work functions so that these electrons can contribute to the tunneling current flowing across the gap between the surface and the STM tip. As mentioned before, the two laser pulses will have to be appropriately synchronized to take care of the physical distance between their locations of impact.

A second example of the application of the present invention is the diagnostics of ultra-fast devices embedded in integrated circuits. In this case, the "pump process" is already provided by the switching of the clock controlling the chip in which the integrated circuit is realized. A pump laser beam is, therefore, not needed. If the clock signal is, e.g., triggering the gate of a fast transistor, the travelling of hot-electrons from source to drain is synchronized with the clock signal. Applying the probe beam between source and drain excites these hot-electrons to an even higher energy level, so that these electrons contribute to the tunneling current measured by the STM. Synchronizing the probe beam with the clock signal automatically synchronizes the probe beam with the travelling of the hot-electrons. Especially interesting is the investigation of new devices like resonant-tunneling transistors, or other devices based on ballistic transport or multi-quantum-well structures.

In a second embodiment of the invention, the same principle of gating an electron flow by a laser pulse is used, yet with the difference that the gating here is not done at the surface of the sample being investigated but at the STM tip. FIG. 4 shows the principle of this embodiment. Tunnel tip 20 consists of an optically transparent body 21, such as sapphire, which carries an electrically conductive member 22 at its lower end. Coated onto the surface of the tip's body 21 and in conductive connection with member 22 is a photoconductor layer 23. The material of which this layer is made can be, for example, radiation-damaged silicon epitaxially grown on sapphire body 21. In this material, the lifetime of the photoelectrons can be as small as a few picoseconds. Alternatively, gallium arsenide or other good photoconductors may be chosen. Whichever material is used, photoconductor layer 23 has a high dark resistance and a low light resistance. Coated onto photoconductor layer 23 is an electrode 24 which has a wire 25 for connecting the tunnel tip to the associated electronics. Electrode 24 does not cover layer 23 along its entire length but leaves a window 28 for laser beam 26 to enter.

By adjusting the length of photoconductive layer 23, its dark-resistance can be made large compared to the resistance $R_t$ across the tunnel gap. The tunneling "dark" current is, accordingly, negligibly small. When laser beam 26 is turned on, the resistance of photoconductor 23 becomes small, connecting member 22 to electrode 24. Now the tunneling current is exclusively determined by $R_t$. Laser pulse 26 may be a focused beam having a pulse width in the pico- or nanosecond range.

The charge $\Delta Q$ transported during gate time $t_g$ in the circuit including tunnel tip 20, the gap resistance $R_t$, and sample 27 is approximately:

$$\Delta Q = U_t \left( \frac{t_g}{R_t} + C_t \right)$$

wherein $U_t$ is the tunneling voltage. In order to extract information on $R_t$ from $\Delta Q$, $$t_g > \tau_t = R_t C_t$$

is required. For high time resolution, $C_t$ should be made as small as possible.

FIG. 5 shows a simple modification of the scheme of FIG. 4. The sapphire body 31 of tunnel tip 30 is shaped to a pointed form. This allows tunnel electrode 32 to be produced lithographically together with contact electrode 33, after photoconductor 34 has been epitaxially grown onto sapphire body 31. The probe pulse 35 is directed onto the window 36 left between tunnel electrode 32 and contact electrode 33 and is, thus, clearly separated from the tunneling region, permitting the investigation of phenomena at the tip/sample position which are sensitive to light.

In cases where such a separation is not required, the realization of this embodiment in accordance with FIG. 6 may be used. Here, the tunneling electrode 37 of tip 38 is designed as a corner 39 of a photoconductor layer 40 deposited on one face 41 of the apex region of sapphire body 42. An electrode 43 covers part of the photoconductor layer 40 and provides for a connection thereof to the associated electronic circuitry. A laser beam 44 impinging upon the tunneling electrode part 37 of photoconductor layer 40 renders tunneling electrode 37 active for the time of the pulse width of the laser beam.

FIG. 7 shows still another possibility for the realization of the embodiment of the invention being described. In particular, this takes care of the shielding problem. Tunnel tip 45 consists of a sapphire body 46 carrying an electrically conducting tunnel electrode 47 at one end and a first photoconductor layer 48 along its side. Layer 48 is connected to tip 47 and covered by an electrode 49, except for a window 50 allowing a first pulsed laser beam 51 to reach photoconductor layer 48 in order to effectively connect tunnel electrode 47 to the associated electronic circuitry. A second photoconductor layer 52 is coated onto the side of body 46 opposite the first photoconductor layer 48. Again, an electrode 53 covers the second photoconductor except for a window 54 through which a second laser beam 55 (possibly split off from the first laser beam 51) can pass to vary the voltage applied to a metal shield 56 which is arranged on an insulating intermediate layer 57 located on the tunnel electrode 47. The voltage variation just mentioned occurs in synchronism with the voltage variation at electrode 47 caused by the gating process. Thus, capacitive effects stemming from the upper part of the tip can be kept to a minimum.

During the gate-off period, the potential of metal shield 56 adjusts to the potential of the sample 58 being investigated via the large resistance 59. Since tip 47 does the same via the tunneling resistance $R_t$, both stay at the same potential as required.

As shown in FIG. 7, metal shield 56 does not entirely cover tunnel tip 47 but leaves a small aperture 60 at the apex thereof, exposing a tip area with a diameter of approximately 10 μm.

As an optional feature, tunnel electrode 47 may be connected via a conductor 61 to a second tunneling circuit 62 which could be used for distance regulation during the comparatively long periods of off-times of the sampling gate. This additional tunneling circuit may also be gated as indicated schematically by switch 63.

While the invention has been shown with respect to particular embodiments thereof, it will be apparent to those of skill in the art that variations may be made therein without departing from the spirit and scope of the present invention. Thus, other modifications can be made to a STM-type structure to allow photon-assisted tunneling in order to obtain the high speed time resolution of narrow optical pulses in combination with the enhanced spatial resolution offered by the STM. For example, applications other than surface studies can be undertaken and related STM-type devices (such as the atomic force microscope) can be utilized.

We claim:

1. A method for investigating a sample with enhanced spatial and time resolution, including the steps of:
    positioning the tunnel tip of a scanning tunneling microscope type device relative to a surface region of a sample to be investigated,
    applying a predetermined electrical potential across the gap between the tunnel tip and said sample, wherein said electrical potential across the tunneling gap is maintained at a level below the one at which a tunneling current normally starts to flow, and including the steps of:
    directing a first optical pulse at the surface of said sample under investigation at a predetermined distance from the surface spot opposite said tunnel tip to excite traveling hot-electrons at the surface of said sample,
    directing a second optical pulse at or in the vicinity of the surface spot at which said tunnel tip is placed, said second optical pulse having a known time relationship with respect to said first optical pulse and further exciting said hot-electrons, the behavior of the time variation of the tunneling current occurring between said surface spot and said tip in response to said hot-electrons being determined.

2. The method of claim 1, wherein said tunnel tip carries a photoconductor, said optical pulse being directed at said photoconductor to render it conductive enabling tunnel current to flow when said optical pulse is present.

3. An optical pulse sampled scanning tunneling microscope type device including:
a tunnel tip positioned at a tunneling distance over a surface region of a sample to be investigated,
means for producing an electrical potential between said tunnel tip and said surface region sufficient to permit a tunnel current to flow between said tunnel tip and said surface region,
means for producing an optical pulse at or in the vicinity of said surface region or at said tunnel tip, and
a photoconductor on said tunnel tip, said optical pulse being incident on said photoconductor.

4. An optical pulse sampled scanning tunneling microscope type device including:
a tunnel tip positioned at a tunneling distance over a surface region of a sample to be investigated,
means for producing an electrical potential between said tunnel tip and said surface region,
means for producing an optical pulse at or in the vicinity of said surface region or at said tunnel tip, and
means for producing a second optical pulse directed at the surface of said sample at a location remote from said surface region.

5. The device of claim 4, wherein the energy of said second optical pulse is sufficient to excite electrons in said sample which travel to said surface region and alter the magnitude of a tunnel current flowing between said tunnel tip and said surface region.

6. The device of claim 5, including measuring means for measuring the variation in tunnel effects due to the arrival of said excited electrons at said surface region.

7. An optical pulse sampled scanning tunneling microscope type device including:
a tunnel tip positioned at a tunneling distance over a surface region of a sample to be investigated,
means for producing an electrical potential between said tunnel tip and said surface region,
means for producing an optical pulse at or in the vicinity of said surface region or at said tunnel tip, and
wherein said sample is optically transparent, said optical pulse being directed through said sample in a direction toward said tunnel tip.

8. The device of claim 7, wherein said tunnel tip includes a substantially transparent body, said optical pulse being directed along said transparent body and exiting at the apex of said tunnel tip, said apex being located over said surface region.

9. The device of claim 8, where said substantially transparent body is coated with a thin conductive layer having a narrow aperture at said apex, said electrical potential being applied between said thin conductive layer and said sample.

10. An optical pulse sampled scanning tunneling microscope type device including:
a tunnel tip positioned at a tunneling distance over a surface region of a sample to be investigated,
means for producing an electrical potential between said tunnel tip and said surface region, and
means for producing an optical pulse at o in the vicinity of said surface region or at said tunnel tip,
wherein said tip includes an insulating body carrying an electrically conductive, pointed electrode member at one end, a photoconductor layer along one side and in contact with said pointed electrode member, and another electrode, said optical pulse being aligned to impinge upon said photoconductor layer.

11. An optical pulse sampled scanning tunneling microscope type device including:
a tunnel tip positioned at a tunneling distance over a surface region of a sample to be investigated,
means for producing an electrical potential between said tunnel tip and said surface region, and
means for producing an optical pulse at or in the vicinity of said surface region or at said tunnel tip,
wherein said tip includes an insulating body having a pointed shape with a tunnel electrode fixed onto one face of said point, said tunnel electrode being in contact with a photoconductor layer that is contacted by a contact electrode, said optical pulse being incident on said photoconductor.

12. An optical pulse sampled scanning tunneling microscope type device including:
a tunnel tip positioned at a tunneling distance over a surface region of a sample to be investigated,
means for producing an electrical potential between said tunnel tip and said surface region, and
means for producing an optical pulse at or in the vicinity of said surface region or at said tunnel tip,
wherein said tip includes an insulating body having a pointed shape with a tunnel electrode there being a photoconductor on one face of said point, said tunnel electrode being in electrical connection with a contact electrode, said photoconductor layer being exposed to said optical pulse.

13. An optical pulse sampled scanning tunneling microscope type device including:
a tunnel tip positioned at a tunneling distance over a surface region of a sample to be investigated,
means for producing an electrical potential between said tunnel tip and said surface region, and
means for producing an optical pulse at or in the vicinity of said surface region or at said tunnel tip,
wherein said tip comprises an insulating body with a tunnel electrode fixed to one end thereof, said tunnel electrode being in electrical contact with a first photoconductor layer to which a first electrode is attached, said first photoconductor being exposed to a first laser beam,
a second photoconductor layer coated onto said insulating body, said second photoconductor, being contact by a second electrode, said second photoconductor being exposed to a second laser beam, said second photoconductor being in electrical contact with a conductive shield coated onto an insulating layer covering said tunnel electrode except for an aperture at the apex of said tunnel electrode, said second laser beam controlling the potential of said conductive shield.

14. A method for investigating a sample, comprising the steps of:
establishing a tunnel current between a pointed tip and a surface region of a sample to be investigated, and
gating said tunnel current by a laser pulse is directed substantially at said surface region of said sample.

* * * * *